Figure 1:
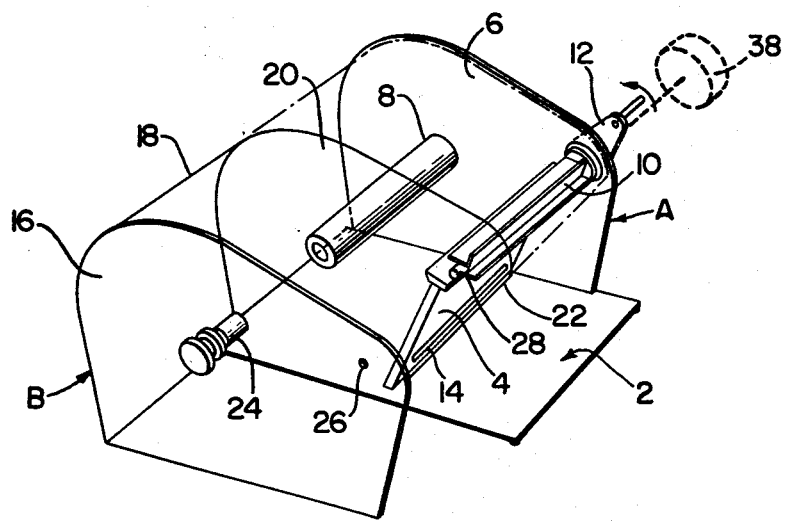

United States Patent [19]
Norgaard

[11] 4,111,333
[45] Sep. 5, 1978

[54] SLICE DISPENSER UNIT

[75] Inventor: Erik Bach Nörgaard, Auning, Denmark

[73] Assignee: Borden Ost A/S, Denmark

[21] Appl. No.: 729,985

[22] Filed: Oct. 6, 1976

[30] Foreign Application Priority Data

Oct. 8, 1975 [DK] Denmark .................... 4518/75

[51] Int. Cl.² .................................... B65H 5/28
[52] U.S. Cl. ........................... 221/73; 242/67.3 R
[58] Field of Search ............... 221/69, 70, 71, 72, 221/73, 74; 242/67.3 R

[56] References Cited

U.S. PATENT DOCUMENTS

| | | | |
|---|---|---|---|
| 1,827,354 | 10/1931 | Cooper | 221/72 X |
| 3,653,539 | 4/1972 | Stageberg | 221/69 X |

FOREIGN PATENT DOCUMENTS

| | | | |
|---|---|---|---|
| 1,003,122 | 2/1957 | Fed. Rep. of Germany | 221/73 |
| 390,541 | 12/1973 | U.S.S.R. | 221/72 |

*Primary Examiner*—Robert B. Reeves
*Assistant Examiner*—Frederick R. Handren
*Attorney, Agent, or Firm*—Craig & Antonelli

[57] ABSTRACT

A dispenser unit comprising or loaded with a supply roll containing sliced cheese, meat or the like, said roll being a rolled up length of a carrier sheet on which the slice material is placed in a strip or row, whereby in the roll the carrier sheet covers the outside of the slice material on the sheet in the underlying winding of the roll, the unit comprising means for rotatably supporting the roll and a guiding edge member enabling the sheet to be drawn off the roll with a substantially sharp bend about the guiding edge so as to cause the slice material to be successively released from the sheet by a pull in the free sheet end downstream of said guiding edge, in which the free sheet end extends from said guiding edge and back to and at least partially about the roll in such a manner that before finally leaving the roll the free sheet end engages and covers the outside of at least a partial length of the slice material constituting the outermost slice material layer of the roll, the unit preferably comprising a handle driven roller for exerting the pull in the free sheet end and wind up this end during operation. The invention further comprises a dispenser device for receiving a supply roll of the said type, this device having a guide means for guiding the sheet as required.

20 Claims, 3 Drawing Figures

SLICE DISPENSER UNIT

The present invention relates to a dispenser unit comprising or loaded with a supply roll containing sliced cheese, meat or the like, said roll being a rolled up length of a carrier sheet on which the slice material is placed in a strip or row, whereby in the roll the carrier sheet covers the outside of the slice material on the sheet in the underlying winding of the roll, the unit comprising means for rotatably supporting the roll and a guiding edge member enabling the sheet length to be drawn off the roll with a substantially sharp bend about the guiding edge so as to cause the slice material to be successively released from the sheet by a pull in the free sheet end downstream of said guiding edge.

Supply rolls of the type in question have been developed for facilitating the work in restaurant and other professional kitchens in which pieces of sliced cheese, meat or the like are used for sandwiches or other purposes. The slices may be produced and packed in the rolls under factory conditions, and in the kitchen it is sufficient to mount the roll in a dispenser device and pull out the carrier sheet in order to release the single slices consecutively. In the single roll the slices carried on the sheet are covered and protected by the rear side of the following winding of the sheet length, and the only problem resides in the fact that the outermost slice layer is exposed to the air, because by the unwinding of the roll the slices will always be liable to stick to the outside of the sheet windings; when the sheet end is pulled away from the roll along a straight line the curved slices in the roll will tend to preserve their curvature and thus be naturally liable to adhere to the still curved underlying sheet winding rather than to the rear side of the pulled off straight sheet end, and hereby the slices will take another turn with the roll and thus appear on the outside of the outermost sheet winding. By the pulling off of the end of the sheet the slices will then be forced to follow the straight movement of the sheet to the said active guiding edge, where they will be released from the sheet as the sheet is caused to be bent sharply away from the adhering inner side of the slices. The consecutive released slices may then be taken by hand and used for the required purpose.

The purpose of this invention is to provide a dispenser unit in which it is obtained in a simple manner that the said outermost slice material layer is not or at least only partially exposed to the air, whereby the sliced material will be less liable to dry out if the dispenser is left unused during a considerable period of time; in practice such period of time is in fact not very long.

According to the invention there is provided a dispenser unit of the type referred to, in which the free sheet end from the roll extends further from said guiding edge back to and at least partially about the roll in such a manner that before finally leaving the roll the free sheet end engages and covers the outside of at least a partial length of the slice material constituting the outermost slice material layer of the roll.

It will be appreciated that in this manner the means for covering at least partially the outer material layer of the roller will be constituted by the free end of the sheet material itself, and that all that is necessary is to return the already pulled-off sheet length to the roll and let this length follow the circumferential movement of the roll before it is finally drawn away from the roll. In this manner the outermost slice layer will be at least partially covered by the sheet material irrespective of the actual diameter of the roll.

The invention further comprises a dispenser device as defined in the appended claims 6–12, i.e. a dispenser device adapted to receive a supply roll of the type in question and to thereafter work according to the principle of the invention. It is considered to be of special importance that the means for guiding away the free sheet end from the supply roll may be a motor or handle driven winding-up roller, and that the dispenser device may include a housing for containing the roll, whereby the slice material is further protected against being dried by the air.

Figure 2:
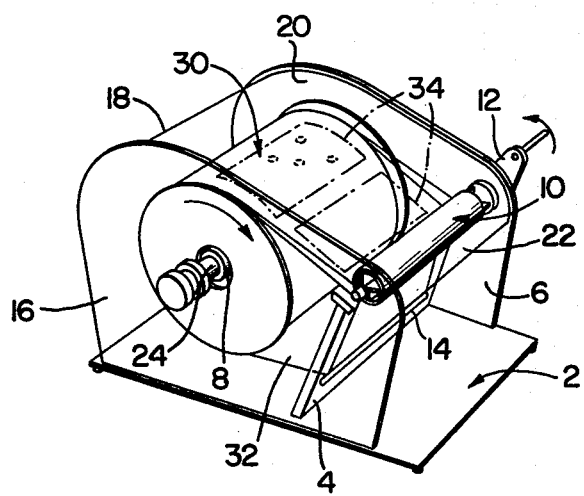
Figure 3:
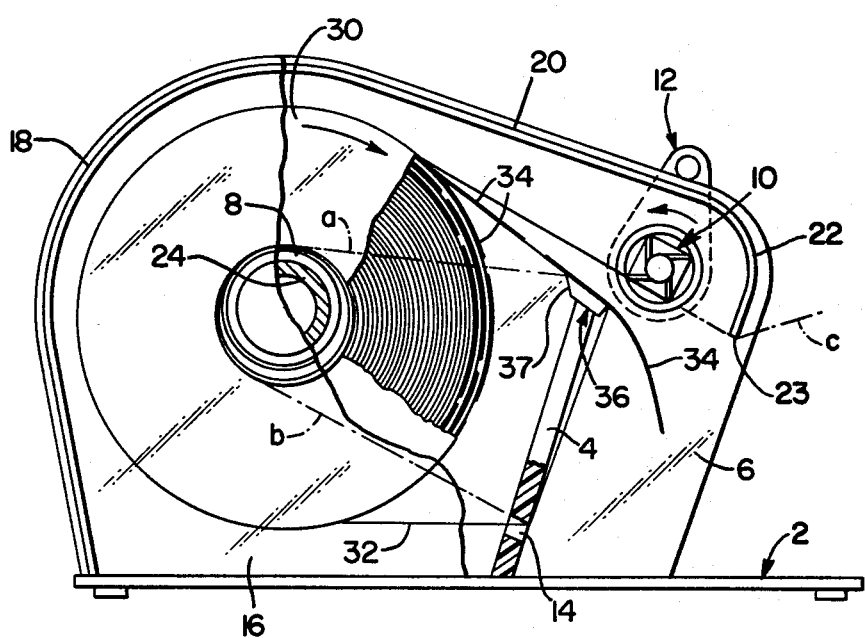

By way of example the invention is described in more detail in the following, reference being made to the accompanying drawing, in which:

FIG. 1 is a perspective, exploded view of a dispenser device according to the invention, FIG. 2 is a perspective view of the assembled device loaded with a supply roll, and FIG. 3 is a side view, partly in section, of the device shown in FIG. 2.

The device shown in FIG. 1 comprises a first portion A including a base plate 2 having an upstanding front wall portion 4 and a side wall 6 to which is rigidly secured a tubular shaft 8 projecting horizontally above the base plate 2. In front of the top edge of the front wall 4 there is mounted a horizontal winding-up roller 10 rotatably held by the side wall and outside this having a handle 12 or motor drive 38 as shown in phantom in FIG. 1. In the lower part of the front wall 4 is provided a transverse slot 14. The device comprises a second portion B which is a housing portion to be detachably assembled with portion A so as to form a side wall 16, a rear wall 18, a roof 20 and an upper front wall portion 22 located in front of the wall 4 of portion A as most clearly shown in FIG. 3. On side wall 16 is provided a locking screw or plug 24 to be received in the free end of the tubular shaft 8 for supporting this end and hold portions A and B together. Additionally the side wall 16 has a hole 26 for receiving pin shaped portion 28 at the end of the roller 10.

Prior to assembling the device a supply roll 30, FIGS. 2 and 3, is placed on shaft 8 and the free end of the sheet length from the roll is arranged to follow a path as described below. Thereafter the device, ready for use, will appear as shown in FIG. 2, all walls of the housing preferably being made of transparent plastics.

The roll 30 to be placed in the device is a rolled up length of a carrier sheet 32, e.g. a film of plastics, on which is placed a row of slices 34 of cheese or the like. Normally the roll is supplied from the factory or cheese dairy with the outermost sheet end, free of slices, being wound a couple of turns about the outermost slice carrying sheet winding in order to protect the outer slices. This free sheet end can be used to "thread" the device, which is done in the following manner:

When the roll is placed on the shaft 8 the sheet end is laid over the top edge 36 of the front wall 4 and put back through the lower slot 14, whereafter it is wound about the rear and upper side of the roll 30 and introduced between the wall top edge 36 and the roller 10 and fastened to this roller 10, e.g. simply by holding it against the roller and giving the handle 12 some turns in direction of the arrow shown.

In use, as clearly illustrated in FIG. 3, further turning of the handle 12 will result in the roller being rotated, the pull in the sheet being transferred to the free sheet loop in front of the roll, and the slice carrying sheet thus being drawn off the roll and passing the wall top edge 36, whereby — due to the relatively sharp bend of the moving sheet at this place — the slice material will be released successively and get delivered to the space in front of the front wall 4, as shown by a slice 34 leaving the sheet. The slice thus dispensed may be received in the hand of the operator and taken away.

It will be appreciated that the outermost slices are always covered by the outer sheet winding, except for those located on the front side of the roll, between the upper roll-off position and the lower roll-on position of the sheet; the latter slices, however, are located inside a small space which is practically fully closed by the side walls and by the said sheet loop itself, so they will not be liable to dry out rapidly. It will, of course, be possible to make the free sheet end encircle a still larger part of the roller surface by arranging the slot 14 in a higher position, even just underneath the edge portion 36, but experiments have shown that at least for certain types of sliced material the sheet is difficult to draw out if the roll surface covering length is too long.

As the diameter of the roll gradually decreases the diameter of the roll of sheet material on the roller 10 will increase, but not to any significant degree. When the last end of the sheet is used the sheet in said loop will extend along the dotted lines a and b in FIG. 3, and when empty the center tube of the roll with associated end flange discs (if any) is removed from the shaft 8 and the rolled up sheet is withdrawn from or cut free of the roller 10, whereafter the device can be reloaded with a new roll.

The use of the sheet collecting roller 10 is not indispensable, as the sheet may be pulled out in a direct manual manner, e.g. with the lower edge 23 of the upper front wall portion 22 used as a guiding edge, as illustrated by a dotted line c in FIG. 3. Alternatively the roller 10 may be driven by a motor (not shown).

The device may, of course, be used or made with any convenient orientation in the space, e.g. with the shaft 8 and the various guiding means extending vertically rather than horizontally. In the preferred horizontal position of the roll the slices might be liable to fall off the roll, but with the permanent use of the outermost cover sheet this will be impossible where the slices are covered, and even in the uncovered area the falling off tendency will be small because the exposed slices are not liable to dry. Should it happen, the dropped slice will appear later on at the delivery end of the device. The same will apply to slices which, by the rolling-off of the slice carrying sheet, should stick to the rear (lower) side of the sheet; such slices will be scraped off from the sheet by means of a rear scraper portion 37 of the edge 36 and thus fall into the space inside said sheet loop.

What is claimed is:

1. A dispenser unit comprising a supply roll containing sliced cheese, meat or the like, said roll being a rolled up length of a carrier sheet on which the slice material is placed in a strip or row, whereby in the roll the carrier sheet covers the outside of the slice material on the sheet in the underlying winding of the roll and has an outer free end portion, said unit further comprising means for rotatably supporting the roll and a guiding edge member enabling the sheet to be drawn off the roll with a substantially sharp bend about the guiding edge so as to cause the slice material to be successively released from the sheet by a pull in the free sheet end downstream of said guiding edge, wherein said free sheet end portion extends from said guiding edge and back to and at least partially about the roll in such a manner that before finally leaving the roll the free sheet end portion engages and covers the outside of at least a partial length of the slice material constituting the outermost slice material layer of the roll.

2. A dispenser unit according to claim 1 further comprising means for receiving and winding up the free sheet end leaving the roll.

3. A dispenser unit according to claim 1 further comprising means for guiding the free sheet end portion leaving the roll so that it is pulled off the roll in substantially the same direction as the pulling off direction of the slice carrying sheet.

4. A dispenser unit according to claim 1 wherein the roll is rotatably supported inside a protective housing having a front opening adjacent which said guiding edge member is arranged.

5. A dispenser unit according to claim 4, in which said protective housing comprises a base plate, an upright front wall portion terminating in a horizontal upper edge constituting said guiding edge, opposed side walls provided with means for rotatably supporting said supply roll, a rear wall portion and a roof portion located between said side walls, said roof portion being extended beyond said front wall and having a downwardly bent front portion, the lower edge of which is located in front of said guiding edge and approximately in level therewith, whereby a substantially horizontal dispenser opening is provided.

6. A dispenser device for sliced cheese, meat or the like comprising means for rotatably supporting a supply roll containing sliced cheese, meat or the like, said roll being a rolled up length of a carrier sheet on which the sliced material is placed in a strip or row, whereby in the roll the carrier sheet covers the outside of the slice material on the sheet in the underlying winding of the roll and has an outer free end portion; a guiding edge member for enabling the carrier sheet of the roll to be pulled off the roll with a substantially sharp bend about an active edge portion of said edge member; and a second sheet guiding member located spaced from said edge member so as to enable a slice material carrying end of the carrier sheet from said roll to pass through the space between the edge member and the second guiding member on its way to and about said active edge portion, said edge member being arranged so as to allow the free sheet end to be guidable from a running-off position on said edge member back to a run-on position on the roll, said second sheet guiding member being located so as to be operable to guide away the free sheet end from a run-off position following said run-on position on the roll, when a pull is exerted in the outermost free sheet end adjacent or beyond the second guiding member.

7. A device according to claim 6, in which the second guiding member is a rotatable winding-up roller for the free sheet end.

8. A device according to claim 6, in which the second guiding member is located so as to cause the free sheet end to be guided away from the roll from a roll-off position substantially corresponding to the position in which the slice carrying sheet end leaves the roll for passage to said edge member.

9. A device according to claim 8, in which the second guiding member is located adjacent said active edge portion of the edge member.

10. A device according to claim 6, characterized in that it comprises a housing including a front wall portion inside which the roll supporting means are arranged, while the said edge member is constituted by an edge portion at the top of said front wall portion.

11. A device according to claim 10, in which the housing has a horizontal base portion, a top portion and a horizontal shaft for carrying the supply roll behind said front wall portion of the housing, the top portion of the housing being extended in front of said front wall portion so that a dispenser opening is formed between the top edge of said front wall and the front end of said top portion.

12. A device according to claim 11, in which the said active edge portion is constituted by the upper edge of said front wall portion, said front wall portion further including a transverse slot in the front wall underneath the top edge thereof, the upper edge of said transverse slot serving as a running-off edge for said free sheet end as it is guided back to said run-on position on the roll.

13. A dispenser unit according to claim 2 wherein said means for receiving and winding up the free sheet end leaving the roll is a rotatable winding roller.

14. A dispenser unit according to claim 13 wherein said rotatable winding roller is motor operated.

15. A dispenser unit according to claim 13 wherein said rotatable winding roller is handle operated.

16. A dispenser unit according to claim 2 wherein said means for receiving and winding up the free sheet end leaving the roll is located so as to pull off the sheet from the roll in substantially the same direction as the pulling off direction of the slice carrying sheet.

17. A dispenser unit according to claim 3 wherein said means for guiding the free sheet end portion leaving the roll is a further guiding edge member.

18. A device according to claim 7, wherein said winding-up roller is motor driven.

19. A device according to claim 7, wherein said winding-up roller is handle driven.

20. A dispenser unit for dispensing material from a supply roll which includes a rolled up length of a carrier sheet on which the material to be dispensed is placed, said dispenser unit comprising:
- means for rotatably supporting said supply roll; and
- means for guiding said carrier sheet from said supply roll and, after the material to be dispensed is removed from said carrier sheet, for guiding the carrier sheet back to and at least partially about said supply roll so that said carrier sheet covers and contacts the outside of at least a portion of said supply roll.

* * * * *